(12) United States Patent
Sako (10) Patent No.: US 7,434,055 B2
(45) Date of Patent: Oct. 7, 2008

(54) RECORDING MEDIUM, RECORDING METHOD OF RECORDING MEDIUM, RECORDING AND/OR REPRODUCING METHOD OF RECORDING MEDIUM, AND DATA COPY CONTROL METHOD

(75) Inventor: Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 839 days.

(21) Appl. No.: 10/049,217

(22) PCT Filed: May 31, 2001

(86) PCT No.: PCT/JP01/04599

§ 371 (c)(1),
(2), (4) Date: Jan. 30, 2002

(87) PCT Pub. No.: WO01/93264

PCT Pub. Date: Dec. 6, 2001

(65) Prior Publication Data

US 2002/0114456 A1 Aug. 22, 2002

(30) Foreign Application Priority Data

May 31, 2000 (JP) ............................ 2000-162491

(51) Int. Cl.
*H04L 9/00* (2006.01)
*H04N 7/167* (2006.01)
(52) U.S. Cl. ...................... 713/176; 380/201
(58) Field of Classification Search .................. 713/176; 380/201
See application file for complete search history.

(56) References Cited

U.S. PATENT DOCUMENTS 6,522,769 B1 * 2/2003 Rhoads et al. ............... 382/100
6,591,365 B1 * 7/2003 Cookson ...................... 713/176
6,633,723 B1 * 10/2003 Kuroda et al. ................. 386/94

FOREIGN PATENT DOCUMENTS

| JP | 1139796 | 6/1989 |
| JP | 11155125 | 6/1999 |
| JP | 11-219172 | 8/1999 |
| JP | 2000-048478 | 2/2000 |
| JP | 2000-057686 | 2/2000 |
| JP | 2000312296 | 11/2000 |
| WO | WO-8908915 | 9/1989 |

OTHER PUBLICATIONS

Sako, Applicant's admitted prior art, Jan. 30, 2002, Backround Art, specification, p. 1.*
4C Entity, LLC, "4C 12 Bit Watermark Specification," Oct. 29, 1999, accessed from http://www.4centity.com/data/tech/4cspec.pdf.*

* cited by examiner

*Primary Examiner*—Nasser Moazzami
*Assistant Examiner*—Brandon S Hoffman
(74) *Attorney, Agent, or Firm*—Lerner, David, Littenberg, Krumholz & Mentlik, LLP

(57) ABSTRACT

A recording medium in which a plurality of management information are embedded and recorded into data of contents in a plurality of forms of different remaining intensities, and at least one of the plurality of management information is the management information whose restriction is more severe than those of the other management information.

42 Claims, 7 Drawing Sheets

Fig. 1

↓ COPY IS PERMITTED IN ACCORDANCE WITH WM2

↓ COPY IS INHIBITED IN ACCORDANCE WITH WM1

Fig. 2A

WM1
4 BITS

Fig. 2B

WM2 | ISRC
4 BITS | 60 BITS

Fig. 2C

0 0 0 0   COPY FREE
0 0 0 1   COPY OF 1-GENERATION IS POSSIBLE
0 0 1 0   COPY OF 2-GENERATION IS POSSIBLE
0 0 1 1   COPY IS IMPOSSIBLE · MOVEMENT IS POSSIBLE
⋮
0 1 1 1   COPY IS IMPOSSIBLE · MOVEMENT IS IMPOSSIBLE
⋮
1 1 1 1   REPRODUCTION IS IMPOSSIBLE

Fig. 3

| WM1  | WM2  |
|------|------|
| 0000 | 0000 |
| 0001 | 0010 |
| 0011 | 0001 |
| 0111 | 0001 |

| COPY MANAGEMENT | WM1 | WM2 |
|---|---|---|
| COPY FREE | 0 | 0 |
| COPY OF 1-GENERATION IS POSSIBLE | 1 | 0 |
| COPY IS IMPOSSIBLE | 1 | 1 |

0: COPY FREE

1: COPY INHIBITION

RECORDING MEDIUM, RECORDING METHOD OF RECORDING MEDIUM, RECORDING AND/OR REPRODUCING METHOD OF RECORDING MEDIUM, AND DATA COPY CONTROL METHOD

TECHNICAL FIELD

The invention relates to a recording medium on which data of contents has been recorded, a recording and/or reproducing method of the recording medium, and a data copy control method, more particularly, to protection of data of contents.

BACKGROUND ART

Development of a watermark such that when data of audio contents or video contents is recorded onto a recording medium, the watermark is embedded as additional information by multiplexing copy management information into the data of the contents for the purpose of protecting a copyright is being advanced. As such a watermark, there are known: a method of inserting the additional information into lower bits of a signal or a high-order coefficient at the time of compression; a method of inserting the additional information by using a masking effect lest the contents is influenced; a method of dispersing a spectrum of the additional information by using a spread spectrum and multiplexing them into the data of the contents; a method of inserting the additional information into a first peak, a second peak, or a location near the first or second peak in a predetermined range; and the like.

In music contents, record companies, computer engineering companies, communication equipment companies, and the like gather and are engaged in an activity called SDMI (Secure Digital Music Initiative).

They are continuing the activity for the purpose of preventing illegal distribution of the music contents via the Internet or the like or an illegal copy of the distributed music contents.

In the SDMI, there is a method of inserting copyright management information into the information of the contents by using a watermark which can be detected even in a state of an analog signal.

It is desirable to insert the watermark in a manner such that there occurs no auditory problem and the watermark is not easily erased even if an A/D conversion or a D/A conversion is repeated or compressing and decompressing processes are repeated.

However, such a powerful watermark that it is not easily erased even if an A/D conversion or a D/A conversion is repeated or compressing and decompressing processes are repeated cannot be easily rewritten. It is, therefore, difficult to make fine management such as generation management of the copy.

That is, as copy management information for protection of the copyright, an SCMS (Serial Copy Management System) is used with respect to the music contents. According to the copy management information of the SCMS, the copy is managed by using information of two bits.

According to the copy management information of the SCMS, not only a copy free and a copy inhibition but also copy management over the generation such as "copy of 1-generation is possible" can be performed. For example, according to the SCMS, the copy of 1-generation is possible when the copy management information SCMS of the original is equal to (0, 1). In this case, when the original information in the recording medium is copied into another recording medium, it is necessary to rewrite the copy management information SCMS from (0, 1) indicative of "copy of 1-generation is possible" to (1, 1) indicative of "copy inhibition".

In case of a watermark of weak intensity such that by executing signal processes such as compressing/decompressing processes or the like, at least a part of it is erased or a part of the information is dropped, rewriting of the watermark can be relatively easy. According to such a watermark of weak intensity, however, there is a problem such that when the copy of the information is repeated, the information of the watermark is erased and the copyright cannot be protected.

It is, therefore, an object of the invention to provide a recording medium, a recording and/or reproducing method of the recording medium, and a data copying method, in which when data of contents is protected by using information of a watermark, finer copyright management can be made and it is also possible to cope with erasure of the watermark in association with repetition of a copy.

Another object of the invention is to provide a recording medium, a recording and/or reproducing method of the recording medium, and a data copying method, in which copy management by generation management can be made without rewriting a watermark.

DISCLOSURE OF INVENTION

According to the invention, there is provided a recording medium in which a plurality of management information are embedded and recorded into data of contents in a plurality of forms of different remaining intensities and at least one of the plurality of management information is the management information whose restriction is severer than those of the other management information.

According to the invention, there is provided a recording method for a recording medium in which, when data of contents is recorded into the recording medium, a plurality of management information such that a managing condition of at least one management information is severer than those of the other management information are embedded and recorded into the data of the contents in a plurality of forms of different remaining intensities.

According to the invention, there is provided a recording method for a recording medium, comprising the steps of:

adding first management information to data of inputted contents;

adding second management information whose remaining intensity is weaker than that of the first management information to the data of the contents to which the first management information has been added; and performing a signal process for recording to the data of the contents to which the first and second management information have been added, and recording the resultant data into the recording medium.

According to the invention, there is provided a recording and/or reproducing method for a recording medium, comprising the steps of:

reading out data of contents from the recording medium in which at least first management information and second management information whose remaining intensity is weaker than that of the first management information have been embedded and recorded in the data of the contents, and discriminating whether the second management information has been detected or not; and when it is determined that the second management information has been detected, a recording and/or reproducing operation is controlled on the basis of the managing condition shown by the second management information.

According to the invention, there is provided a recording and/or reproducing method for a recording medium, comprising the steps of:

reading out data of contents from the recording medium in which at least first management information and second management information whose remaining intensity is weaker than that of the first management information have been embedded and recorded in the data of the contents, and discriminating whether the first management information has been detected or not;

discriminating whether the second management information has been detected or not; and when it is determined that the second management information has been detected, controlling a recording and/or reproducing operation on the basis of a managing condition shown by the second management information.

According to the invention, there is provided a copy control method of data of contents, comprising the steps of:

discriminating whether second management information has been detected or not from the data of the contents in which at least first management information and the second management information whose remaining intensity is weaker than that of the first management information have been embedded or not; and when it is determined that the second management information has been detected, controlling a copying operation of the data of the contents on the basis of a managing condition shown by the second management information.

According to the invention, there is provided a reproducing apparatus of a recording medium, comprising:

a head for reading out data of contents from the recording medium in which at least first management information and second management information whose remaining intensity is weaker than that of the first management information have been embedded and recorded;

a signal processing unit for performing a signal process to the data of the contents readout from the recording medium by the head;

a switching circuit unit to which an output signal from the signal processing unit is supplied;

a detecting circuit for detecting the second management information from the data of the contents read out from the recording medium by the head; and a discriminating circuit to which a detection result by the detecting circuit is supplied and which controls an on/off operation of the switching circuit unit on the basis of a managing condition shown by the second management information when the detection result showing that the second management information has been detected by the detecting circuit is supplied.

The two watermarks comprising the watermark of the strong remaining intensity and the watermark of the weak remaining intensity are multiplexed into the data of the contents and recorded into the recording medium. The management information of severer restriction is recorded into the watermark of the strong remaining intensity. In the case where the contents in which such two kinds of watermarks have been inserted is returned to an analog signal, reproduced, digitized again, and recorded, the information of the watermark of the weak remaining intensity is extinguished due to noises which are generated in association with the D/A conversion and the A/D conversion. However, the information of the watermark of the strong remaining intensity remains.

Upon reproduction, whether the information of the watermark of the weak remaining intensity and the information of the watermark of the strong remaining intensity could be detected or not is discriminated. If both of the watermark of the strong remaining intensity and the watermark of the weak remaining intensity exist, the copy and the reproduction are managed in accordance with the management information of the watermark of the weak remaining intensity. If only the information of the watermark of the strong remaining intensity is found, the copy and the reproduction are managed in accordance with the management information of the watermark of the strong remaining intensity.

In case of the watermark of the weak remaining intensity, the user can relatively easily write information of a new watermark. Therefore, various information can be added to the watermark and fine services can be realized. In case of the watermark of the strong remaining intensity, it is difficult for the user to newly rewrite it. If the watermark of the strong remaining intensity remains, the illegal copy can be prevented.

BEST MODE FOR CARRYING OUT THE INVENTION

Figure 1:
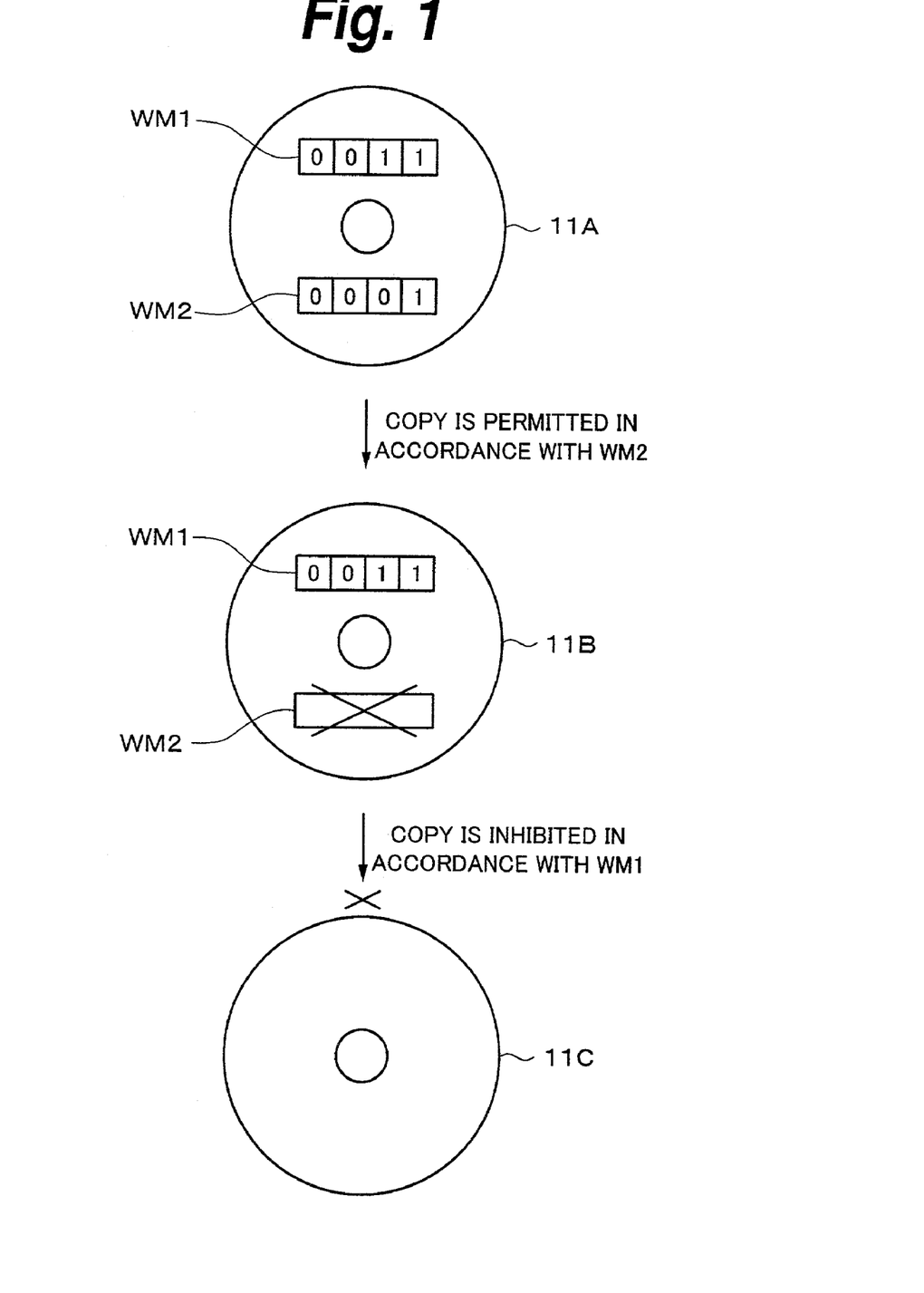
FIG. 1 is a schematic diagram for use in explanation of a recording medium to which the invention is applied.

An embodiment of the invention will be described hereinbelow with reference to the drawings. In FIG. 1, two watermarks comprising a watermark WM1 and a watermark WM2 have been multiplexed to data of contents and recorded into an original recording medium 11A. The watermark WM1 is a watermark of a strong remaining intensity. The watermark WM2 is a watermark of a weak remaining intensity.

The "remaining intensity" used here denotes a degree of difficulty of erasure of the watermark in the case where signal processes such as A/D conversion, D/A conversion, compression, decompression, etc. have been executed to information to/in which the watermark has been added or embedded. For example, the watermark embedded into the information by the method whereby the information of the watermark is spread-spectrum diffused and multiplexed to the data of the contents or the method whereby a peak value of a signal of the data of the contents is detected and the information of the watermark is inserted into the peak value is the watermark of the strong remaining intensity, that is, a strong watermark. On the other hand, for example, the watermark embedded into the information by the method whereby the information of the watermark is inserted into lower bits of the information of the contents or the method whereby the information of the watermark is inserted into a high-order coefficient upon compression of the information of the contents is the watermark of the weak remaining intensity, that is, a weak watermark. In case of the strong watermark, since the watermark has been embedded by the method of the spread spectrum as mentioned above, it is not extinguished even if the signal processes such as compression and the like are executed to the information signal. On the other hand, in case of the weak watermark, since the watermark has been embedded into the lower bits of the information signal as mentioned above, or the like, it is easily lost when the compressing process or the like is executed to the information signal.

Figure 2A:
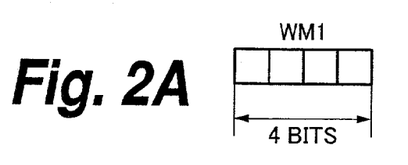
FIGS. 2A, 2B, and 2C are schematic diagrams for use in explanation of examples of watermarks.
Figure 2B:
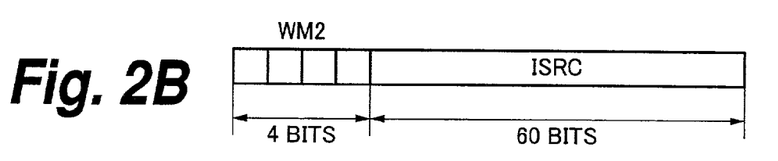
Figure 2C:
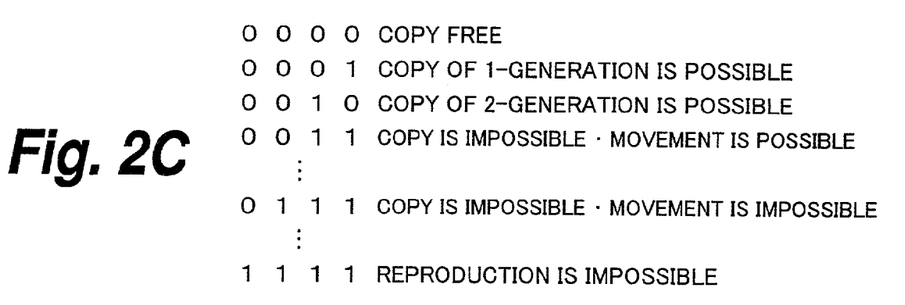

As shown in FIG. 2A, the watermark WM1 in FIG. 1 consists of, for example, 4 bits and is defined as shown in FIG. 2C. As shown in FIG. 2B, the watermark WM2 consists of, for example, 4 bits and is defined as shown in FIG. 2C.

That is, each of the watermarks WM1 and WM2 is defined as follows: (0,0,0,0) indicates "copy free"; (0,0,0,1) indicates "copy of 1-generation is possible"; (0,0,1,0) indicates "copy of 2-generation is possible"; (0,0,1,1) indicates "copy is impossible * movement is possible "; (0,1,1,1) indicates "copy is impossible movement is possible"; and (1,1,1,1) indicates "reproduction is impossible".

Further, as shown in FIG. 2B, copyright management information of, for example, an ISRC (International Standard Recoding Code) is added to the watermark WM2. The ISRC is information of 60 bits and enables the contents to be identified one by one all over the world. For example, when a case where music data as contents has been recorded on a CD (Compact Disc) is considered as an example, even in case of the same music piece, different ISRCs are allocated to a certain CD-α and a certain CD-β. Therefore, from which source the music piece has been obtained can be known on the basis of the allocated ISRC.

Although the ISRC is inserted only into the watermark WM2 in the examples shown in FIGS. 2A and 2B, the ISRC can be also inserted into both of the watermarks WM1 and WM2.

Figure 3:
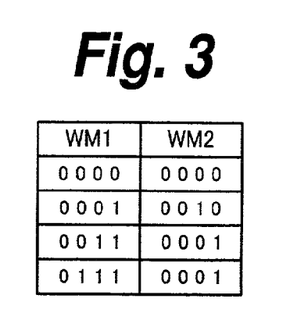
FIG. 3 is a schematic diagram for use in explanation of an example of a watermark.

As combinations of the information of the watermark WM1 and the information of the watermark WM2, combinations as shown in FIG. 3 are considered. As shown in FIG. 3, the watermark WM1 of the strong remaining intensity has the severer management information than that of the watermark WM2 of the weak remaining intensity.

For example, as shown in FIG. 1, the copy management information of (0,0,0,1) showing "copy of 1-generation is possible" of the data of the contents is recorded in the watermark WM2 of the weak remaining intensity. The copy management information of, for example, (0,0,1,1) showing "copy is impossible" of the data of the contents corresponding to the severer copying condition than that of the watermark WM2 is recorded in the watermark WM1 of the strong remaining intensity.

Upon reproduction, whether the information of the watermark WM1 of the strong remaining intensity and the information of the watermark WM2 of the weak remaining intensity could be detected from the data of the contents or not is discriminated. If both of the watermark WM1 of the strong remaining intensity and the watermark WM2 of the weak remaining intensity are detected, the copy and the reproduction of the data of the contents are managed in accordance with the management information of the watermark WM2 of the weak remaining intensity. If only the information of the watermark WM1 of the strong remaining intensity could be detected, the copy and the reproduction are managed in accordance with the management information of the watermark WM1 of the strong remaining intensity.

If the recording medium to be reproduced is the original recording medium 11A, the information of the watermark WM1 of the strong remaining intensity and the information of the watermark WM2 of the weak remaining intensity can be detected from the data and the data of the contents read out from the recording medium. In case of a copy recording medium 11B obtained by repetitively copying instead of the original recording medium 11A, there is a possibility that the information of the watermark WM2 of the weak remaining intensity is extinguished by repeating the copy. When the information read out from the original recording medium 11A is copied to the recording medium 11B as mentioned above, the watermark WM2 to be added is rewritten to the management information (0,0,1,1) showing the copy inhibition from the information showing "copy of 1-generation is possible". Therefore, if the user intends to also record the data of the contents read out from the recording medium 11B onto further another recording medium, the recording operation regarding the copy is inhibited because the watermark WM2 has been set to the management information showing the copy inhibition.

In case of copying the original recording medium 11A, since the information of the watermark WM1 of the strong remaining intensity and the information of the watermark WM2 of the weak remaining intensity can be detected, the copy and the reproduction are managed in accordance with the information of the watermark WM2 of the weak remaining intensity. The copy management information (0,0,0,1) showing "copy of 1-generation is possible" has been recorded in the watermark WM2 of the weak remaining intensity. Therefore, the copy from the original recording medium 11A shown in FIG. 1 to the recording medium 11B shown in FIG. 1 can be performed on the basis of the watermark WM2.

In case of further copying the recording medium 11B obtained by repeating the copy instead of the original recording medium 11A to a recording medium 11C, as shown in FIG. 1, although the watermark WM1 of the strong remaining intensity remains on the recording medium 11B, the watermark WM2 of the weak remaining intensity is extinguished by the repetition of the copy. That is, by repeating the signal process of the data read out from the recording medium serving as a copying source when the copy is executed, the weak watermark WM2 is often lost. Therefore, in case of the recording medium 11B obtained by repeating the copy, since the watermark WM1 of the strong remaining intensity remains, the information of the watermark WM1 of the strong remaining intensity can be detected. However, the information of the watermark WM2 of the weak remaining intensity cannot be detected.

In this case, the copy and the reproduction of the data in the recording medium are managed in accordance with the information of the watermark which can be detected, that is, the remaining watermark WM1 of the strong remaining intensity. For example, as shown in FIG. 1, the copy management information (0,0,1,1) showing "copy is impossible" has been recorded in the watermark WM1 of the strong remaining intensity on the recording medium. Therefore, if the recording medium to be reproduced is the copy recording medium 11B, the copy of the data from the recording medium 11B to the recording medium 11C cannot be performed on the basis of the watermark WM1.

As mentioned above, if the watermark of the weak remaining intensity and the watermark of the strong remaining intensity are recorded and the severe management information such as a copy inhibition is recorded in the watermark of the strong remaining intensity, the finer copyright management can be made by using the information of the watermark of the weak remaining intensity. Even if the watermark of the weak intensity was extinguished, the illegal copy can be prevented by using the information of the watermark of the strong remaining intensity.

In the above example, the two kinds of watermarks such as watermark of the strong remaining intensity and watermark of the weak remaining intensity are prepared. However, further, a plurality of watermarks can be also multiplexed to the data of the contents and recorded. By such a method, the further fine management of the copy and the reproduction can be made by using the information of each of the watermarks. If the severe management information such as a copy inhibition is recorded in the watermark of the strong remaining intensity, even when the watermark of the weak intensity was extinguished, the illegal copy can be prevented.

Figure 4:
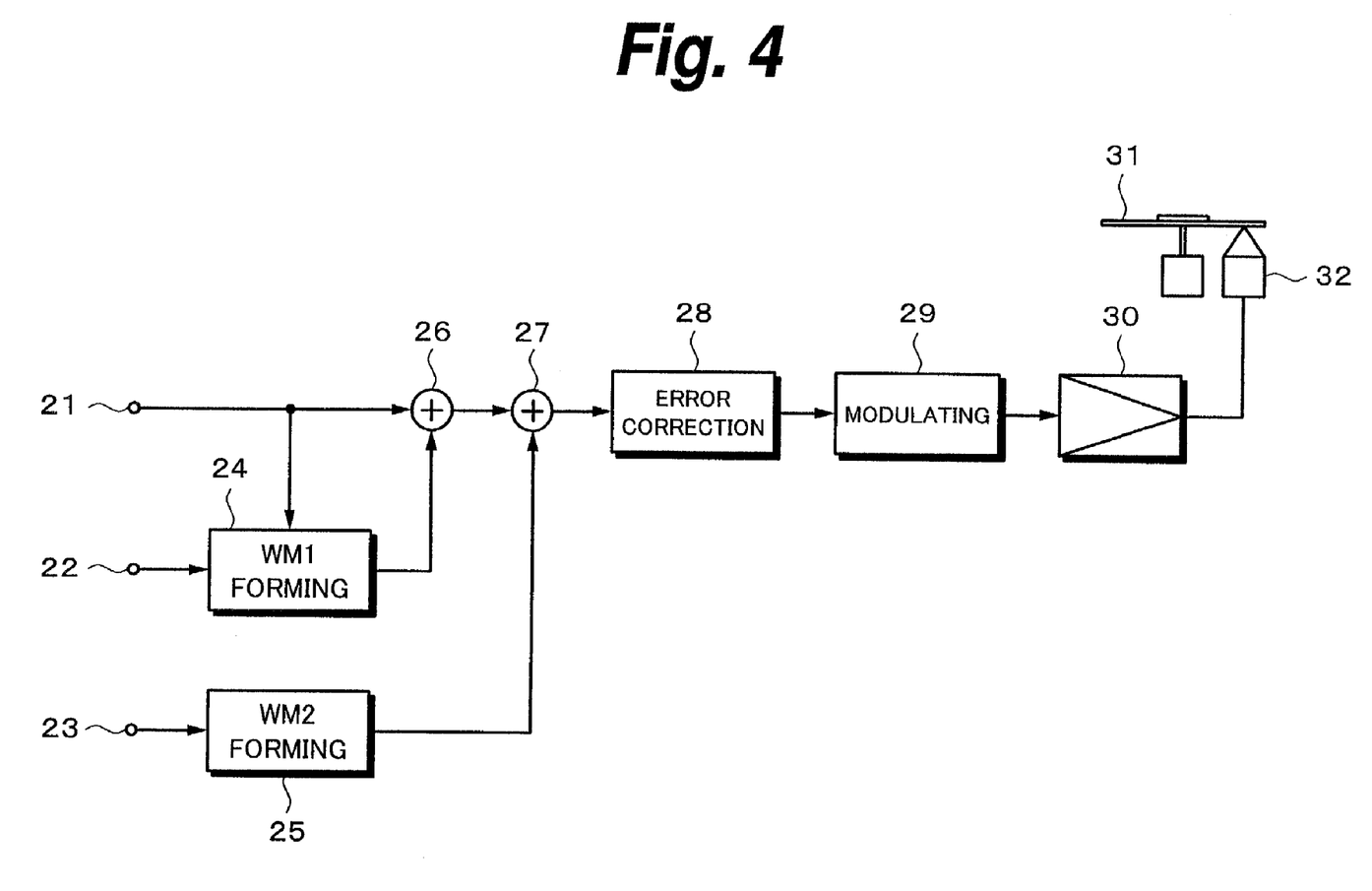
FIG. 4 is a block diagram of an example of a recording apparatus to which the invention is applied.

FIG. 4 shows an example of a recording apparatus for multiplexing watermark WM1 of the strong remaining intensity and watermark WM2 of the weak remaining intensity into the data of the contents and recording into the recording medium. In the example, a recordable optical disk such as CD-R (Compact Disc Recordable) or CD-RW (Compact Disc Rewritable) is used as a recording medium.

In FIG. 4, the data of the contents to be recorded onto an optical disk 31 as a recording medium is supplied to an input terminal 21. The data of the watermark WM1 of the strong remaining intensity is supplied to an input terminal 22. The data of the watermark WM2 of the weak remaining intensity is supplied to an input terminal 23.

The management information of the watermark WM1 of the strong remaining intensity as mentioned above is included in the data of the watermark WM1 which is supplied to the input terminal 22. The management information of the watermark WM2 of the weak remaining intensity as mentioned above is included in the data of the watermark WM2 which is supplied to the input terminal 23.

The data of the watermark WM1 from the input terminal 21 is supplied to a first watermark forming circuit 24. In the first watermark forming circuit 24, the information of the watermark is formed on the basis of the data from the input terminal 22. The information of the watermark formed by the first watermark forming circuit 24 is supplied to a first watermark adding circuit 26.

The first watermark forming circuit 24 forms the information of the watermark of the strong remaining intensity. As a watermark of the strong remaining intensity, it is possible to use the method whereby the information of the watermark is spread-spectrum diffused and multiplexed to the data of the contents, the method whereby the peak value of the signal is detected and the watermark is inserted to the peak value, or the like. In case of inserting the watermark into the data by the method whereby the peak value of the signal which is recorded into the recording medium is detected and the watermark is inserted to the signal which is recorded into the recording medium corresponding to the detected peak value, in order to detect the peak value from the data of the contents, the data from the input terminal 21 is supplied to the first watermark forming circuit 24. For example, the peak value of the data supplied from the input terminal 21 is detected by the first watermark forming circuit 24. The formed watermark WM1 is supplied to the first watermark adding circuit 26 so that the formed watermark WM1 is embedded into the detected peak value.

The data of the watermark WM2 from the input terminal 23 is supplied to a second watermark forming circuit 25. In the second watermark forming circuit 25, information of the watermark is formed on the basis of the data from the input terminal 23. The information of the watermark is supplied to a second watermark adding circuit 27. By the first watermark adding circuit 26, the watermark of the weak remaining intensity is added so as to be embedded into the data of the contents added with the watermark WM1 of the strong remaining intensity.

The second watermark forming circuit 25 forms the information of the watermark of the weak remaining intensity. As a watermark of the weak remaining intensity, it is possible to use the method of inserting the information of the watermark into the lower bits of the data of the contents or the method of inserting the information of the watermark into the high-order coefficient at the time of compression of the data of the contents.

The data of the contents from the input terminal 21 is supplied to the first watermark adding circuit 26. The information of the watermark WM1 of the strong remaining intensity is multiplexed to the contents data by the first watermark adding circuit 26. An output of the first watermark adding circuit 26 is supplied to the second watermark adding circuit 27. By the second watermark adding circuit 27, the information of the watermark WM2 of the weak remaining intensity is multiplexed to the data outputted from the first watermark adding circuit 26.

As mentioned above, the data of the contents to which the information of the watermark WM1 of the strong remaining intensity and the watermark WM2 of the weak remaining intensity have been multiplexed is supplied to an error correction encoding circuit 28. An error correction encoding process is executed to the data of the contents by the error correction encoding circuit 28. An output of the error correction encoding circuit 28 is supplied to a modulating circuit 29 and a modulating process is executed. An output of the modulating circuit 29 is supplied to an optical pickup 32 through a recording amplifier 30. The data of the contents to which the watermark WM1 of the strong remaining intensity and the watermark WM2 of the weak remaining intensity have been multiplexed is recorded onto the optical disk 31 by the optical pickup 32.

Figure 5:
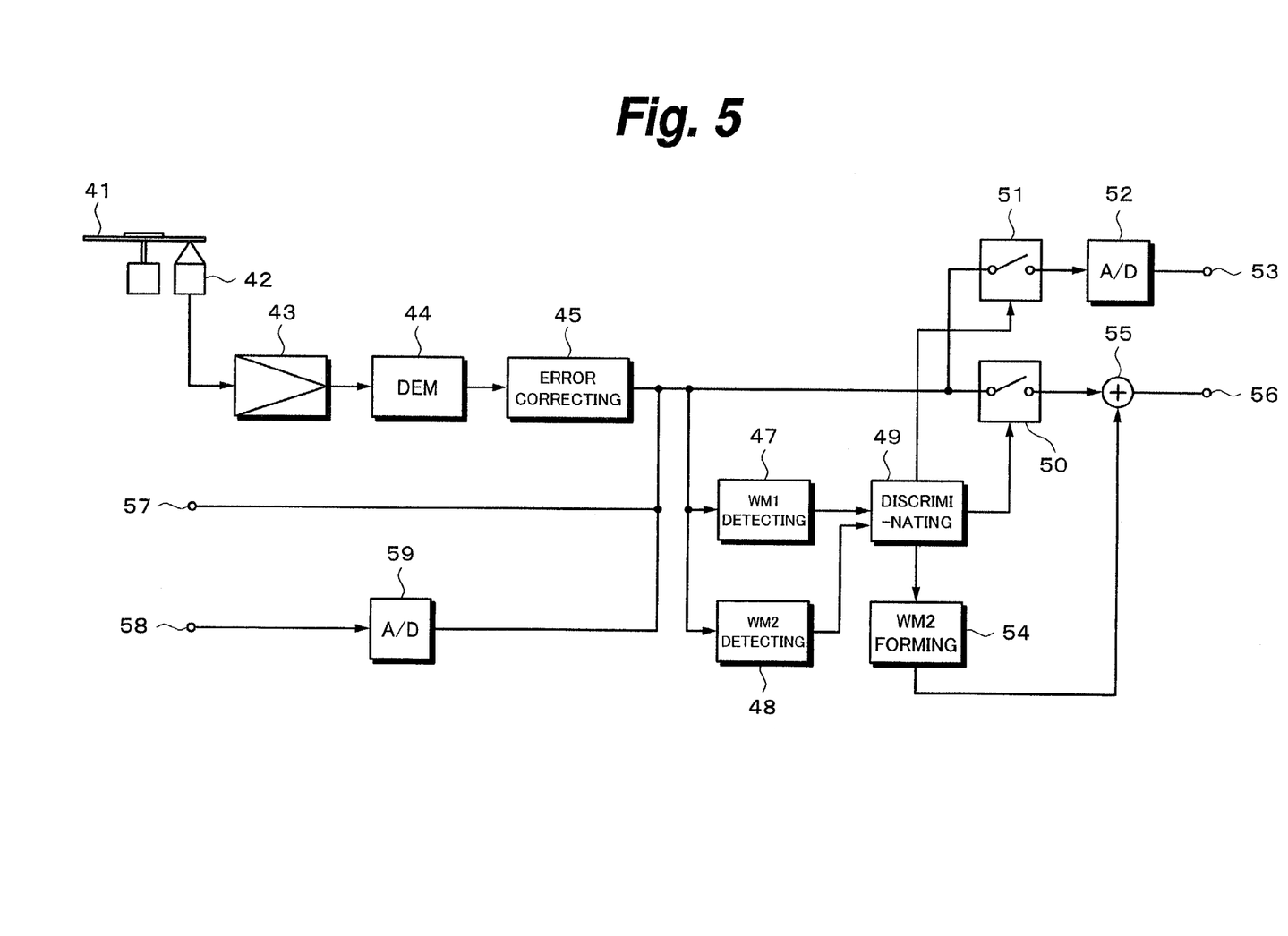
FIG. 5 is a block diagram of an example of a reproducing apparatus to which the invention is applied.

FIG. 5 shows an example of a reproducing apparatus. In FIG. 5, recording data on an optical disk 41 is read out by an optical pickup 42. Data of contents has been recorded on the optical disk 41. The watermark WM1 of the strong remaining intensity and the watermark WM2 of the weak remaining intensity have been multiplexed in the data of the contents.

The data read out from the optical disk 41 by the optical pickup 42 is supplied to a demodulating circuit 44 through a reproducing amplifier 43 and subjected to a demodulating process corresponding to the modulating process performed by the foregoing modulating circuit 29. An output of the demodulating circuit 44 is supplied to an error correcting circuit 45. In the error correcting circuit 45, an error correcting process is executed to the output data from the demodulating circuit 44.

An output of the error correcting circuit 45 is supplied to switching circuits 50 and 51 and also supplied to a first watermark detecting circuit 47 and a second watermark detecting circuit 48, respectively.

The first watermark detecting circuit 47 detects the information of the watermark WM1 of the strong remaining intensity between the watermarks which have been multiplexed to the data of the contents and recorded onto the optical disk 41. An output of the first watermark detecting circuit 47 is supplied to a discriminating circuit 49.

The second watermark detecting circuit 48 detects the information of the watermark WM2 of the weak remaining intensity between the watermarks which have been multiplexed to the data of the contents and recorded on the optical disk 41. An output of the second watermark detecting circuit 48 is supplied to the discriminating circuit 49.

The discriminating circuit 49 discriminates "possible/impossible" of the copy and "possible/impossible" of the reproduction from the detection output of the first watermark detecting circuit 47 and the detection output of the second watermark detecting circuit 48, controls the first and second switching circuits 50 and 51 in accordance with discrimination results, and manages the copy and the reproduction.

The discriminating circuit 49 discriminates whether the information WM1 of the watermark of the strong remaining intensity and the information WM2 of the watermark of the weak remaining intensity could be detected or not on the basis of the outputs of the first and second watermark detecting circuits 47 and 48. If it is determined that both of the watermark WM1 of the strong remaining intensity and the watermark WM2 of the weak remaining intensity could be detected, the copy and the reproduction of the data of the contents read out from the optical disk 41 are managed in accordance with the management information of the watermark WM2 of the weak remaining intensity. If only the watermark WM1 of the strong remaining intensity is detected, the copy and the reproduction of the contents read out from the optical disk 41 are managed in accordance with the management information of the watermark WM1 of the strong remaining intensity.

If it is determined by the discriminating circuit 49 that both of the copy and the reproduction are permitted from the watermark WM1 on the basis of the management information of the watermark WM2, the first and second switching circuits 50 and 51 are turned on. If it is determined by the discriminating circuit 49 that the copy is inhibited, the first switching circuit 50 is turned off by the discriminating circuit 49. If it is determined by the discriminating circuit 49 that the reproduction is inhibited by the watermark WM1 or WM2 as mentioned above, the second switching circuit 51 is turned off by the discriminating circuit 49.

When the management of the generation is made or the like, there is a case where it is necessary to rewrite the watermark. The rewriting of the watermark is executed only with respect to the weak watermark WM2. In case of rewriting the watermark, an output of the discriminating circuit 49 is supplied to a watermark forming circuit 54. The information of the watermark WM2 of the weak remaining intensity to be rewritten is formed by the watermark forming circuit 54. The information of the watermark WM2 is supplied to a watermark adding circuit 55 and added to the output data from the error correcting circuit 45. In this case, the watermark WM2 is rewritten, for example, from the managing condition indicative of "copy of 1-generation is possible" to a managing condition indicative of "copy is impossible".

If it is determined by the discriminating circuit 49 that both of the copy and the reproduction are permitted on the basis of the watermark WM1 or WM2, the reproduction data on the optical disk which is outputted from the error correcting circuit 45 is outputted from a data output terminal 56 through the first switching circuit 50 and watermark adding circuit 55 and is also outputted from an analog output terminal 53 through the switching circuit 51 and a D/A converter 52.

In case of the copy inhibition and the reproduction permission, the second switching circuit 51 is turned on and the first switching circuit 50 is turned off. Therefore, only an analog output converted into the analog signal by the A/D converter 52 and outputted from the analog output terminal 53 is obtained. The data from the data output terminal 56 is not outputted.

If it is determined by the discriminating circuit 49 that both of the copy and the reproduction are inhibited, both of the first and second switching circuits 50 and 51 are turned off. The analog output from the analog output terminal 53 and the data output from the data output terminal 56 are not obtained.

Figure 6:
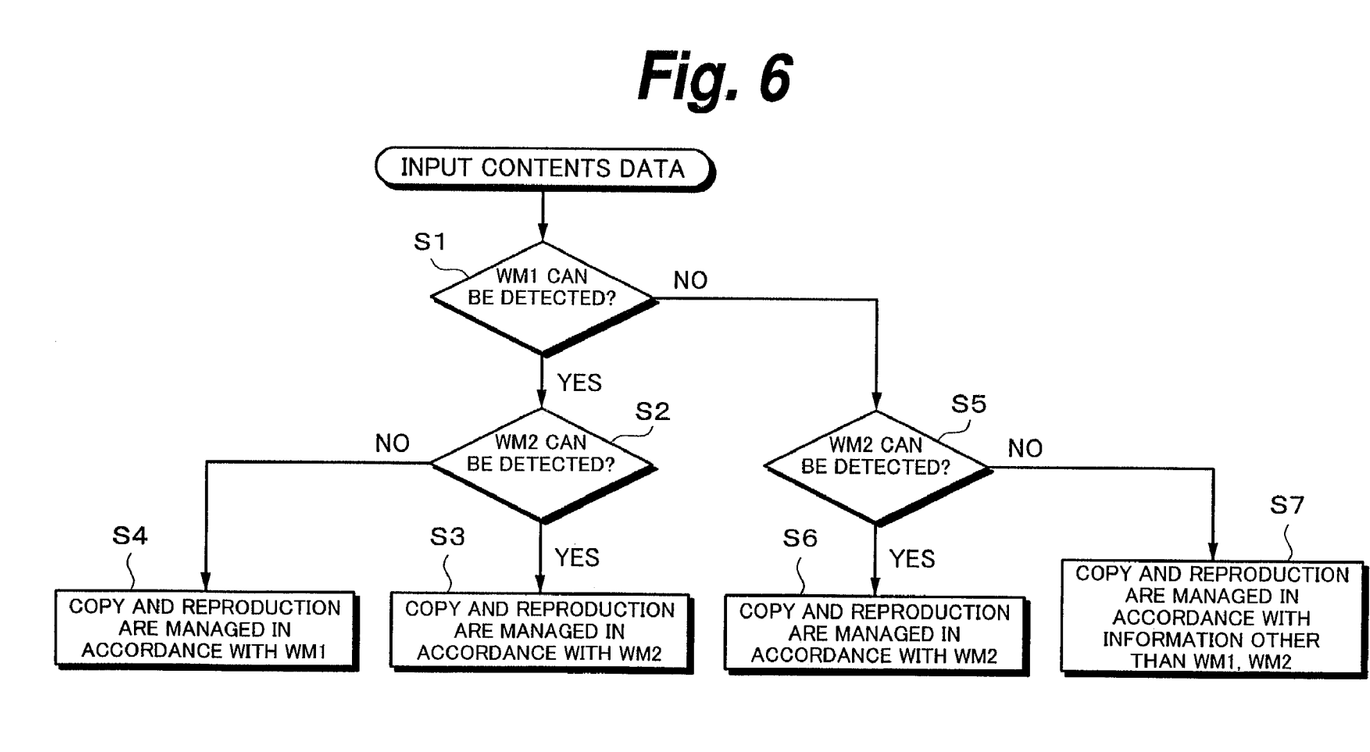
FIG. 6 is a flowchart for use in explanation of an example of management based on a detection output of a watermark.

FIG. 6 shows the process of the discriminating circuit 49. In FIG. 6, whether the information of the watermark WM1 of the strong remaining intensity could be detected from the signal read out from the optical disk 41 by the optical pickup 42 or not is discriminated (step S1). If the information of the watermark WM1 of the strong remaining intensity could be detected, whether the watermark WM2 of the weak remaining intensity could be detected from the signal read out from the optical disk 41 by the optical pickup 42 or not is discriminated (step S2).

If the watermark WM2 of the weak remaining intensity could be detected in step S2, the first and second switching circuits 50 and 51 are controlled so as to manage the copy and the reproduction in accordance with the information of the watermark WM2 of the weak remaining intensity (step S3).

If the watermark WM2 of the weak remaining intensity cannot be detected in step S2, the first and second switching circuits 50 and 51 are controlled so as to manage the copy and the reproduction in accordance with the information of the watermark WM1 of the strong remaining intensity (step S4).

If it is determined by the discriminating circuit 49 that both of the copy and the reproduction are permitted on the basis of the watermarks WM2 and WM1, both of the first and second switching circuits 50 and 51 are turned on. If it is determined by the discriminating circuit 49 that the copy is inhibited, the second switching circuit 51 is turned on and the first switching circuit 50 is turned off. If it is determined by the discriminating circuit 49 that both of the copy and the reproduction are inhibited, both of the first and second switching circuits 50 and 51 are turned off.

If it is determined in step S1 that the watermark WM1 of the strong remaining intensity cannot be detected from the signal read out from the optical disk 41 by the optical pickup 42, whether the watermark WM2 of the weak remaining intensity could be detected from the signal read out from the optical disk 41 by the optical pickup 42 or not is discriminated (step S5). If the watermark WM2 of the weak remaining intensity could be detected in step S5, the first and second switching circuits 50 and 51 are controlled so as to manage the copy and the reproduction of the data of the contents read out from the optical disk 41 in accordance with the information of the watermark WM2 of the weak remaining intensity (step S6).

If it is determined in step S5 that the watermark WM2 cannot be detected, the management by the watermark is not made but the copy and the reproduction are managed on the basis of the information other than the watermarks WM1 and WM2 (step S7). For example, in this case, both of the first and second switching circuits 50 and 51 are turned on.

In the process of the discriminating circuit 49, as shown in steps S1 to S4, whether the information WM1 of the watermark of the strong remaining intensity and the information WM2 of the watermark of the weak remaining intensity could be detected from the data of the contents read out from the optical disk 41 or not is discriminated. If both of the watermark WM1 of the strong remaining intensity and the watermark WM2 of the weak remaining intensity could be detected, the copy and the reproduction of the data of the contents read out from the optical disk 41 are managed in accordance with the management information of the watermark WM2 of the weak remaining intensity. If the watermark WM2 of the weak remaining intensity cannot be detected, the copy and the reproduction of the data are managed in accordance with the management information of the watermark WM1 of the strong remaining intensity.

Since the watermark WM1 is a watermark of the strong remaining intensity and the watermark WM2 is a watermark of the weak remaining intensity, even if the watermark WM2 is extinguished by the signal process due to the copy or the like, the watermark WM1 will be hardly extinguished by the signal process which is executed to the data. Thus, the fine copy and reproduction can be managed by the watermark WM2 of the weak remaining intensity. Even if the watermark WM2 of the weak remaining intensity is extinguished, the illegal copy can be prevented by the watermark WM1 of the strong remaining intensity.

A recording medium such that only the watermark WM2 has been recorded in the data of the contents or a recording medium such that the data of the contents in which no watermark is recorded has been recorded is also considered. In case of the recording medium in which only the watermark WM2 has been recorded, it is determined in step S5 that it is the recording medium in which only the watermark WM2 has been recorded. The copy and the reproduction are managed in accordance with the management information of the watermark WM2 in step S6. If it is decided that no watermark is recorded, the copy and the reproduction are managed by the SCMS or the like other than the watermark or the process is performed as "copy free" in step S7.

If it is assumed that the watermark WM1 is certainly recorded, it is also possible to construct the apparatus so as to inhibit the copy because a possibility that the contents in which the watermark WM1 is not detected is illegal is high.

Further, if both of the watermark of the weak remaining intensity and the watermark of the strong remaining intensity are recorded as mentioned above, the copy management of the data of the contents according to the generation can be made by using only the simple information such as "copy is possible" and "copy is impossible" without rewriting the information.

Figure 7:
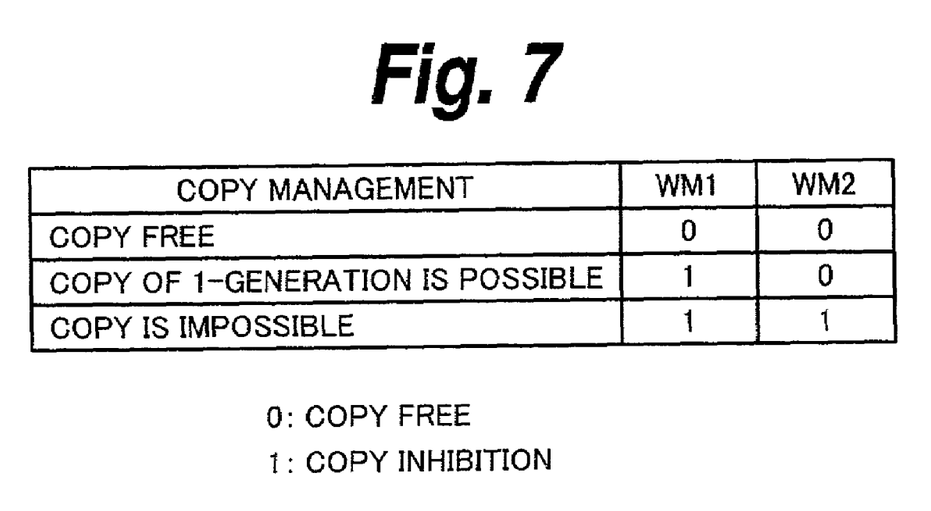
FIG. 7 is a schematic diagram for use in explanation of another example of a watermark.

That is, for example, as shown in FIG. 7, the watermark WM1 of the strong remaining intensity and the watermark WM2 of the weak remaining intensity are prepared. If the data of the contents recorded on the recording medium or the like is "copy free" data, both of the watermarks WM1 and WM2 are set to "0" indicative of "copy free". In case of "copy of 1-generation is possible", the watermark WM1 is set to "1" and the watermark WM2 is set to "0". In case of "copy inhibition", both of the watermarks WM1 and WM2 are set to "1".

Figure 8:
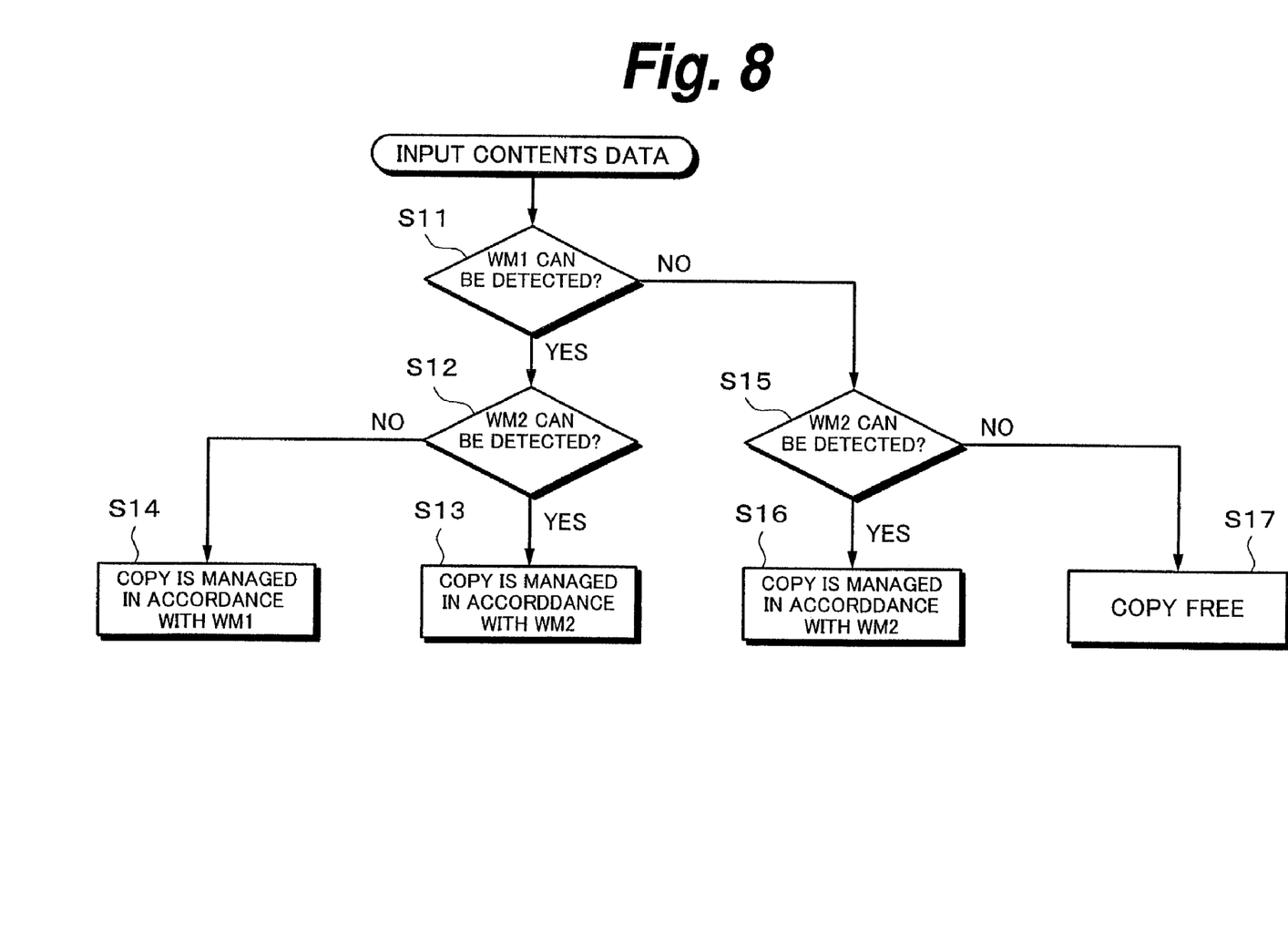
FIG. 8 is a flowchart for use in explanation of another example of management based on the detection output of the watermark.

The copy of the data of the contents is managed by using the information of the watermarks WM1 and WM2 as shown in FIG. 7 in accordance with processes as shown in FIG. 8.

In FIG. 8, whether the information of the watermark WM1 of the strong remaining intensity could be detected from the data of the contents which was inputted or read out from the recording medium or not is discriminated (step S11). If the information of the watermark WM1 of the strong remaining intensity could be detected, whether the watermark WM2 of the weak remaining intensity could be detected or not is discriminated (step S12). If the information of the watermark WM2 of the weak remaining intensity could be detected in step S12, the copy management such that the copy of the data of the contents of at least one generation is permitted if the watermark WM2 is equal to "0", or the like is made in accordance with the information of the watermark WM2 of the weak remaining intensity (step S13) as shown in, for example, FIG. 7. If the watermark WM2 of the weak remaining intensity cannot be detected in step S12, the copy of the data of the contents is managed in accordance with the information of the watermark WM1 of the strong remaining intensity (step S14). In this case, the copy of the contents data is inhibited unless the watermark WM1 is equal to "0".

If it is determined in step S11 that the watermark WM1 of the strong remaining intensity cannot be detected from the data of the contents, whether the watermark WM2 of the weak remaining intensity could be detected or not is discriminated (step S15). If the watermark WM2 of the weak remaining intensity could be detected, the copy management is made in accordance with the information of the watermark WM2 of the weak remaining intensity (step S16) in a manner similar to step S13 mentioned above. If it is determined in step S15 that the watermark WM2 cannot be detected, neither the watermark WM1 nor WM2 is added to the inputted data of the contents and the copy of the data of the contents is set to be free (step S17).

In the above processes, as shown in steps S11 to S14, whether the information WM1 of the watermark of the strong remaining intensity and the information WM2 of the watermark of the weak remaining intensity of the data of the contents which was inputted or read out from the recording medium could be detected or not is discriminated. If it is determined that both of the watermark WM1 of the strong remaining intensity and the watermark WM2 of the weak remaining intensity could be detected, the copy management of the data of the contents is made in accordance with the management information of the watermark WM2 of the weak remaining intensity. If the watermark WM2 of the weak remaining intensity cannot be detected, the copy management of the data of the contents is made in accordance with the management information of the watermark WM1 of the strong remaining intensity.

Since the watermark WM1 is a watermark of the strong remaining intensity and the watermark WM2 is a watermark of the weak remaining intensity, even if the watermark WM2 is extinguished from the data by the signal processes upon copying, the watermark WM1 is seldom extinguished. Consequently, in case of the original recording medium or the data of the original contents, the watermarks WM1 and WM2 are detected. In case of the copied recording medium, only the watermark WM1 of the strong remaining intensity remains and the watermark WM2 of the weak remaining intensity is erased or lost by the signal processes which are executed upon copying.

In case of the original recording medium or the data of the original contents, both of the two watermarks WM1 and WM2 are detected. In this case, in step S13, the watermark WM2 of the weak remaining intensity is preferentially used and the copy management is made in accordance with the watermark WM2. At this time, in the case where both of the watermarks WM1 and WM2 are set to "0" indicative of "copy free" (WM1=0, WM2=0) and in the case where the watermark WM1 is set to "1" and the watermark WM2 is set to "0" (WM1=1, WM2=0), since the watermark WM2 is set to "0" indicative of "copy free", the copy of the data read out from the original recording medium or the data of the original contents is permitted. When both of the watermarks WM1 and WM2 are set to "1" indicative of "copy inhibition" (WM1=1, WM2=1), since the watermark WM2 is set to "1" indicative of "copy inhibition", the copy of the data read out from the original recording medium or the data of the original contents is inhibited.

In case of the copied recording medium or the data of the copied contents, the watermark WM2 of the weak remaining intensity is erased by the signal process for copying the data read out from the original recording medium or the data of the original contents, or the like, and only the watermark WM1 of the strong remaining intensity is detected from the data read out from the copied recording medium. Therefore, the copy management is made in accordance with the watermark WM1 in step S14. At this time, when both of the watermarks WM1 and WM2 are set to "0" indicative of "copy free" (WM1=0, WM2=0; however, the watermark WM2 has been extinguished), since the watermark WM1 is set to "0" indicative of "copy permission", the further copy of the data read out from the copied recording medium or the data of the copied contents is permitted. If the watermark WM1 is set to "1" and the watermark WM2 is set to "0" (WM1=1, WM2=0; however, the watermark WM2 has been extinguished), since the watermark WM1 is set to "1" indicative of "copy inhibition", the further copy of the data is inhibited. If both of the watermarks WM1 and WM2 are set to "1" indicative of "copy inhibition" (WM1=1, WM2=1; however, the watermark WM2 has been extinguished), since the watermark WM1 is set to "1" indicative of "copy inhibition", the further copy of the data is inhibited.

As mentioned above, by repeating the copy of the data, the watermark WM2 of the weak remaining intensity is lost, that is, extinguished from the data. Therefore, if the watermark WM1 has been set to "1" and the watermark WM2 has been set to "0", so long as the data is the data read out from the original recording medium or the original data, the copy is permitted. So long as the data is the data read out from the copied recording medium or the copied data, the further copy is inhibited. The copy management based on the generation can be made without rewriting the information of the watermark.

According to the invention, the watermark of the strong remaining intensity and the watermark of the weak remaining intensity are multiplexed to the data of the contents and recorded onto the recording medium, and the management information of the severer restriction is recorded in the watermark of the strong remaining intensity. Upon reproduction, whether the information of the watermark of the weak remaining intensity and the information of the watermark of the strong remaining intensity could be detected or not is discriminated. If both of the watermark of the strong remaining intensity and the watermark of the weak remaining intensity exist, the copy and the reproduction are managed in accordance with the management information of the watermark of the weak remaining intensity. If only the information of the watermark of the strong remaining intensity is found, the copy and the reproduction are managed in accordance with the management information of the watermark of the strong remaining intensity.

With respect to the watermark of the weak remaining intensity, the user can relatively easily write information of a new watermark. Therefore, various information can be added to the watermark and fine services can be realized. With respect to the watermark of the strong remaining intensity, it is difficult for the user to newly rewrite it. If the watermark of the strong remaining intensity remains, the illegal copy can be prevented.

Further, if the watermark of the strong remaining intensity and the watermark of the weak remaining intensity are multiplexed to the data of the contents and recorded onto the recording medium and the management information of the severer restriction is recorded into the watermark of the strong remaining intensity, the generation management of the copy can be made without rewriting the management information.

INDUSTRIAL APPLICABILITY

As mentioned above, the recording medium, the recording method of the recording medium, the recording and/or reproducing method of the recording medium, and the data copy control method according to the invention are suitable when they are used for protecting the data of the contents recorded in the recording medium.

The invention claimed is:

1. A recording medium in which a plurality of management information are embedded and recorded into content data in a plurality of forms of different remaining intensities, the plurality of forms of different remaining intensity comprising a watermark of strong remaining intensity and a watermark of weak remaining intensity,
   wherein management information written into the watermark of the strong remaining intensity is more severe than the management information written into the watermark of the weaker remaining intensity,
   wherein said management information in the watermark of the strong remaining intensity remains even if a signal process is executed to the content data and said management information in the watermark of the weak remaining intensity is erased by executing a signal process to the content data;
   the watermark of strong remaining intensity being less likely than the watermark of weak remaining intensity to be altered by processing of the content data; and
   wherein the management information in the watermark of the weak remaining intensity comprises an International Standard Recording Code (ISRC).

2. The recording medium according to claim 1, wherein said management information includes at least one of copy management information for managing a copying operation of the content data and reproduction management information for managing a reproducing operation of the content data.

3. The recording medium according to claim 1, wherein said form of a strong remaining intensity by which said management information is embedded in the content data is a form such that said management information spread-spectrum diffused and multiplexed into the content data.

4. The recording medium according to claim 1, wherein said form of the strong remaining intensity by which said management information is embedded in the data of said contents is a form such that said management information is inserted either at one of a first peak and a second peak in a predetermined range of the content data or at a position near one of said first peak and said second peak.

5. The recording medium according to claim 1, wherein said form of the weak remaining intensity by which said management information is embedded in the content data is a form such that said management information is inserted into lower bits of the content data.

6. The recording medium according to claim 1, wherein said form of the weak remaining intensity by which said management information is embedded in the content data is a form such that said management information is inserted into a high-order coefficient at the time when the content data have been compressed.

7. The recording medium according to claim 1, wherein among said plurality of management information, a managing condition of the management information embedded in the form of the strong remaining intensity by which said management information is embedded in the content data is more severe than that of the management information embedded in the form of the weak remaining intensity by which said management information is embedded in the content data.

8. The recording medium according to claim 7 wherein when said management information is copy management information, the management information embedded in the form of the strong remaining intensity by which said management information is embedded in the content data is a managing condition showing that copying is impossible.

9. The recording medium according to claim 7, wherein when said management information is reproduction management information, the management information embedded in the form of the strong remaining intensity by which said management information is embedded in the content data is a managing condition showing that reproduction is impossible.

10. A recording method for a recording medium in which, when content data is recorded into the recording medium, management information are embedded and recorded into the content data in a plurality of forms of different remaining intensities, the plurality of forms of different remaining intensities comprising a watermark of strong remaining intensity and a watermark of weak remaining intensity,
wherein management information written into the watermark of the strong remaining intensity is more severe than the management information written into the watermark of the weaker remaining intensity,
wherein said management information in the watermark of the strong remaining intensity remains even if a signal process is executed to the content data and said management information in the watermark of the weak remaining intensity is erased by executing a signal process to the content data; the watermark of strong remaining intensity being less likely than the watermark of weak remaining intensity to be altered by processing of the content data; and
wherein the management information in the watermark of the weak remaining intensity comprises an International Standard Recording Code (ISRC).

11. The recording method for a recording medium according to claim 10, wherein said management information includes at least one of copy management information for managing a copying operation of one of the data of said contents and reproduction management information for managing a reproducing operation of one if the data of said contents and said recording medium.

12. The recording method for a recording medium according to claim 11, wherein by performing a spread-spectrum process to said management information and multiplexing and recording the resultant management information into the content data, said form of the strong remaining intensity is realized.

13. The recording method for a recording medium according to claim 11, wherein said management information inserted at one of a first peak and a second peak in a predetermined range of the data of said contents or at a position near one of said first and second peak, thereby realizing said form of the strong remaining intensity.

14. The recording method for a recording medium according to claim 11, wherein said management information is inserted into lower bits of the content data, thereby realizing said form of the weak remaining intensity.

15. The recording method for a recording medium according to claim 11, wherein said management information is inserted into a high-order coefficient at a time when the content data has been compressed, thereby realizing said form of the weak remaining intensity.

16. The recording method for a recording medium according to claim 11, wherein among said plurality of management information, a managing condition of the management information embedded in the form of the strong remaining intensity by which said management information is embedded in the content data is more severe than a managing condition of the management information embedded in the form of the weak remaining intensity by which said management information is embedded in the content data.

17. A recording method for a recording medium, comprising the steps of:
adding first management information to input content data;
adding second management information whose remaining intensity is weaker than a remaining intensity of said first management information to the content data to which said first management information has been added;
performing a recording signal process on the content data to which said first and second management information have been added; and
recording resultant data into the recording medium,
wherein said first management information remains even if a signal process is executed to the content data recorded on the recording medium and said second management information is erased by executing a signal process to the content data recorded on the recording medium;
the first management information being less likely than the second management information to be altered by processing of the content data; and
wherein the second management information comprises an International Standard Recording Code (ISRC).

18. The recording method for a recording medium according to claim 17, wherein a managing condition by said first management information is more severe than a managing condition by said second management information.

19. The recording method for a recording medium according to claim 18, wherein when each of said first and second management information is copy management information, the managing condition by said first management information is a managing condition showing that copying is impossible.

20. A recording and/or reproducing method for a recording medium, comprising the steps of:
reading out content data from the recording medium in which at least first management information and second management information whose remaining intensity is weaker than a remaining intensity of said first management information have been embedded and recorded in the data of said contents, and discriminating whether said second management information has been detected;
wherein when it is determined that said second management information has been detected, a recording and reproducing operation are controlled based on managing condition shown by said second management information,
wherein said first management information remains during the recording and reproducing operation and said second management information is erased during the recording and reproducing operation;
the first management information being less likely than the second management information to be altered by processing of the content data; and
wherein the second management information comprises an International Standard Recording Code (ISRC).

21. The recording and/or reproducing method for a recording medium according to claim 20, wherein when it is determined that said second management information is not detected, the recording and/or reproducing operation are controlled based on said first management information.

22. The recording and/or reproducing method for a recording medium according to claim 20, wherein the managing condition by said first management information is more severe than a managing condition by said second management information.

23. The recording and/or reproducing method for a recording medium according to claim 22, wherein
when each of said first and second management information is copy management information, the managing condition by said first management information is a managing condition showing that copying is impossible, and
when it is determined that said second management information has been detected, the recording operation is controlled based on said second management information, and when it is determined that said second management information is not detected, the recording operation is inhibited based on said first management information.

24. The recording and/or reproducing method for a recording medium according to claim 22, wherein
when each of said first and second management information is reproduction management information, the managing condition by said first management information is a managing condition showing that reproduction is impossible, and
when it is determined that said second management information has been detected, the reproducing operation controlled based on said second management information, and when it is determined that said second management information is not detected, the reproducing operation is inhibited based on said first management information.

25. A recording and/or reproducing method for a recording medium, comprising the steps of:
reading out content data from the recording medium in which at least first management information and second management information whose remaining intensity is weaker than a remaining intensity of said first management information have been embedded and recorded in the content data, and discriminating whether said first management information has been detected;
discriminating whether said second management information has been detected; and p1 when it is determined that said second management information has been detected, controlling a recording and/or reproducing operation based on a managing condition shown by said second management information,
wherein said first management information remains during the recording and/or reproducing operation and said second management information is erased during the recording and/or reproducing operation;
the first management information being less likely than the second management information to be altered by processing of the content data; and
wherein the second management information comprises an International Standard Recording Code (ISRC).

26. The recording and/or reproducing method for a recording medium according to claim 25, wherein when is determined that said second management information is not detected, the recording and/or reproducing operation controlled based or, said first management information.

27. The recording and/or reproducing method for a recording medium according to claim 25, wherein when it is determined that said first management information is not detected, the recording and/or reproducing operation is controlled based on said second management information.

28. The recording and/or reproducing method for a recording medium according to claim 25, wherein when it is determined that neither said first nor second management information is detected, the recording and/or reproducing operation is controlled based on additional information added to the content data.

29. The recording and/or reproducing method for a recording medium according to claim 25, wherein a managing condition by said first management information is more severe than a managing condition by said second management information.

30. The recording and/or reproducing method for a recording medium according to claim 29, wherein
when each of said first and second management information is copy management information a managing condition showing that copying is impossible, and
when it is determined that said second management information has been detected, the recording operation is controlled based on said second management information, and when it is determined that said second management information is not detected, the recording operation is inhibited based on said first management information.

31. The recording and/or reproducing method for a recording medium according to claim 30, wherein when said second management information indicates a managing condition which permits a copy of the content data read out from said recording medium, the recording operation regarding a copy of the content data is controlled based on said second management information, and said second management information which is added to said content data to be copied is rewritten to the managing condition showing that copying is impossible.

32. The recording and/or reproducing method for a recording medium according to claim 29, wherein
when each of said first and second management information is reproduction management information, the managing condition by first management information is a managing condition showing that reproduction is impossible, and
when it is determined that said second management information has been detected, the reproducing operation is controlled based on said second management information, and when it is determined that said second management information is not detected, the reproducing operation is inhibited based on said first management information.

33. A copy control method for content data, the method comprising the steps of:
discriminating whether second management information has been detected from the content data in which at least first management information and the second management information whose remaining intensity weaker than a remaining intensity of said first management information have been embedded; and
when it is determined that said second management information has been detected, controlling a copying operation of the data of said contents based on a managing condition shown by said second management information,
wherein said first management information is copied during the copying operation and said second management information is not copied during the copying operation;
the first management information being less likely than the second management information to be altered by processing of the content data; and
wherein the second management information comprises an International Standard Recording Code (ISRC).

34. The copy control method for content data according to claim 33, wherein when it is determined that said second management information is not detected, the copying operation of the data of said contents is controlled based on said first management information.

35. The copy control method for content data according to claim 33, wherein a managing condition by said first management information is more severe than that by said second management information.

36. The copy control method for content data according to claim 33, wherein when each of said first and second management information is copy management information, the managing condition by said first management information is a managing condition showing that copying is impossible, and when it is determined that said second management information has been detected, the copying operation of the data of said contents controlled based on said second management information, and when it is determined that said second management information is not detected, the copying operation of the content data is inhibited based on said first management information.

37. The copy control method for content data according to claim 36, wherein when second management information permits the copying of the content data the copying operation of the content data is permitted based on said second management information, and said second management information which is added to said content data which is copied is rewritten to a managing condition for inhibiting the copying of the content data.

38. A reproducing apparatus for reproducing a recording medium, comprising:

a head for reading out content data from the recording medium which at least first management information and second management information whose remaining intensity is weaker than remaining intensity of said first management information have been embedded and recorded;

a signal processing unit for performing a signal process to the content data read out from said recording medium by said head;

a switching circuit unit to which an output signal from said signal processing unit is supplied;

a detecting circuit for detecting said second management information from the content data read out from said recording medium by said head; and a discriminating circuit to which a detection result by said detecting circuit is supplied and which controls an on/off operation of said switching circuit unit based on a managing condition shown by said second management information when the detection result showing that said second management information has been detected by said detecting circuit is supplied thereto wherein said first management information remains even if the signal process is executed to the content data and said second management information is erased by executing the signal process to the content data;

the first management information being less likely than the second management information to be altered by processing of the content data; and wherein the second management information comprises an International Standard Recording Code (ISRC).

39. The reproducing apparatus according to claim 38, wherein when it is determined that said second management information not detected, the on/off operation of said switching circuit unit is controlled based on said first management information.

40. The reproducing apparatus according to claim 38, further comprising a converting unit to which the output signal from said signal processing unit is supplied and which converts said supplied output signal into an analog signal, and wherein said switching circuit unit has a first switching circuit to which the output signal from said signal processing unit is supplied and a second switching circuit to which an output signal from said converting unit is supplied.

41. The reproducing apparatus according to claim 40, wherein when each of said first and second management information is copy management information, on/off operations of said first and second switching circuits are controlled based on a managing condition shown by said second management information, and when said second management information cannot be detected, said first switching circuit is turned off based on said first management information.

42. The reproducing apparatus of the recording medium according to claim 40, wherein when each of said first and second management information is reproduction management information, on/off operations of said first and second switching circuits are controlled based on a managing condition shown by said second management information, and when said second management information cannot be detected, said second switching circuit is turned off based on said first management information.

* * * * *